United States Patent [19]

Chang

[11] Patent Number: 4,958,842
[45] Date of Patent: Sep. 25, 1990

[54] CONVERTIBLE TOY KIT

[76] Inventor: Morgan Chang, No. 291, Sec. 1, Chang Nan Rd., Chang Hua City, Taiwan

[21] Appl. No.: 340,131

[22] Filed: Apr. 18, 1989

[51] Int. Cl.⁵ .............................................. B62K 13/00
[52] U.S. Cl. ...................................... 280/7.1; 280/30; 280/87.041; 280/282; 280/287
[58] Field of Search ...................... 280/7.1, 7.17, 7.15, 280/30, 20, 87.042, 87.041, 282, 287, 278

[56] References Cited

U.S. PATENT DOCUMENTS

| | | | |
|---|---|---|---|
| 545,712 | 9/1895 | Morton | 280/7.1 |
| 1,431,214 | 10/1922 | Burgess | 280/7.1 |
| 2,481,837 | 9/1949 | Giese | 280/7.1 |
| 2,768,834 | 10/1956 | Wilson | 280/7.1 |

FOREIGN PATENT DOCUMENTS 470310  4/1952  Italy ................................ 280/7.17

Primary Examiner—David M. Mitchell
Attorney, Agent, or Firm—Bernard R. Gans

[57] ABSTRACT

A toy kit convertible to form a scooter, a rocking horse, or a tricycle. The scooter is generally a toy vehicle with a pair of extendable rear wheel assemblies. One or more sets of female retainers are provided on the rear end of the scooter. The rocking horse has a pair of parallel and foldable bases with one holf fixed by several lateral bars and a seat portion supported on the central position of the rocking horse. One or more sets of male retainers are provided on the lateral bars of the base of the rocking horse. The rocking horse can be disposed on and engaged with the scooter by the connection between the female retainers of the scooter and the male retainers of the rocking horse so as to form a tricycle.

8 Claims, 7 Drawing Sheets

CONVERTIBLE TOY KIT

FIELD OF THE INVENTION

The present invention relates to a toy kit, and more particularly relates to a toy kit which is convertible to a rocking horse, scooter, or a tricycle.

BACKGROUND OF THE INVENTION

Normally, children have various interests and curiosities; they are not always satisfied with a single toy. Therefore most children have a lot of toys to fulfill their expectations or curiosities. However, a lot of separate pre-assembled toys do not develop the child's creativity and logical thinking ability and cost a lot of money.

The present invention has arisen to mitigate and/or obviate the afore-described disadvantages of the toys.

SUMMARY OF THE INVENTION

The primary object of the present invention is to provide a convertible toy kit which encourages the child's creativity and logical thinking ability.

Another object of the present invention is to provide a convertible toy kit which has a number of different constructions including a rocking horse, scooter and tricycle.

Therefore, the present invention provides a convertible toy kit which comprises a scooter and a rocking horse which can be assembled into a tricycle. The scooter is generally a toy vehicle with a pair of detachable and extendable wheel assemblies disposed on a foot plate. The foot plate is pivoted on a front portion having a pair of handles on an upper end and a front wheel on a lower end. One or more sets of female retainers are formed on the foot plate of the scooter. The rocking horse has a foldable base portion with a pair of parallel and foldable bars and a seat portion with a handle portion on one end and a foldable seat back on the other end, the seat portion is disposed at the central position of the foldable base portion. One or more sets of male retainers are provided on the base portion of the rocking horse. The rocking horse can be disposed on and engaged with the scooter by the connection between the female retainers of the scooter and the male retainers of the rocking horse when the foldable base portion of said rocking horse is folded, thereby assembling a tricycle.

DETAILED DESCRIPTION OF THE EMBODIMENT

Figure 1:
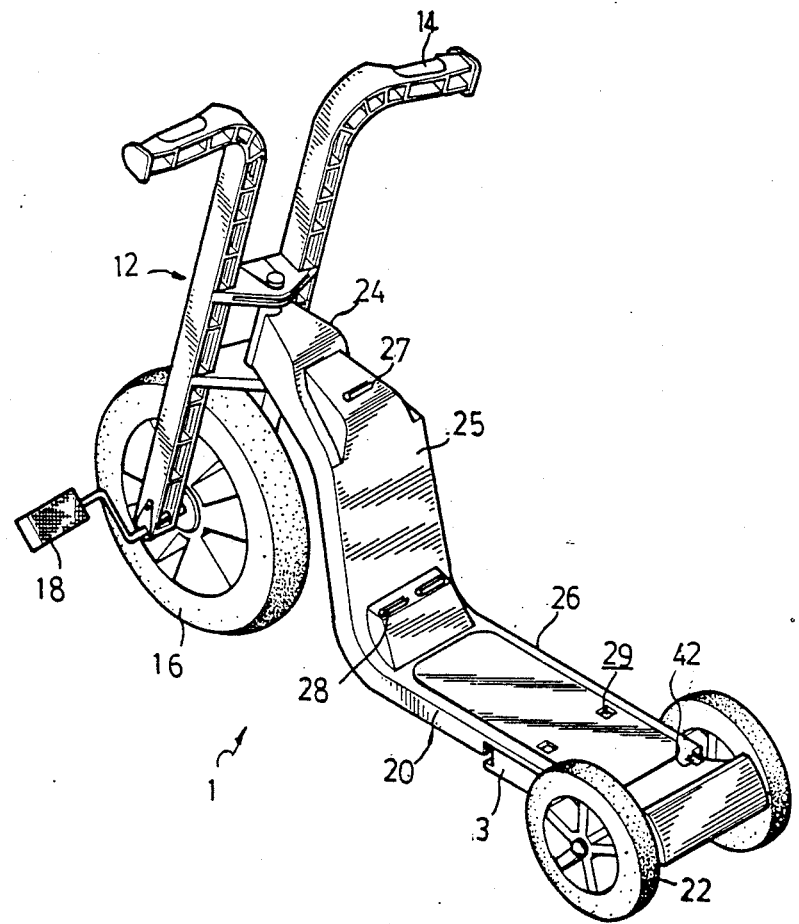
FIG. 1 is a perspective view of a scooter in accordance with the present invention.
Figure 3:
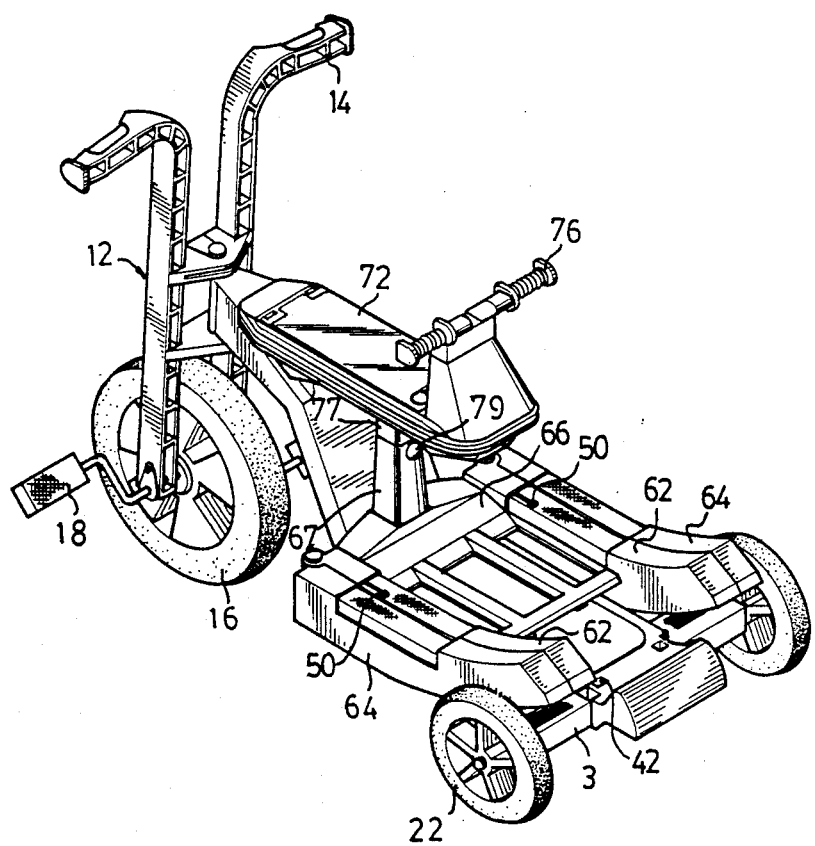
FIG. 3 is a perspective view of a tricycle in accordance with the present invention.
Figure 4:
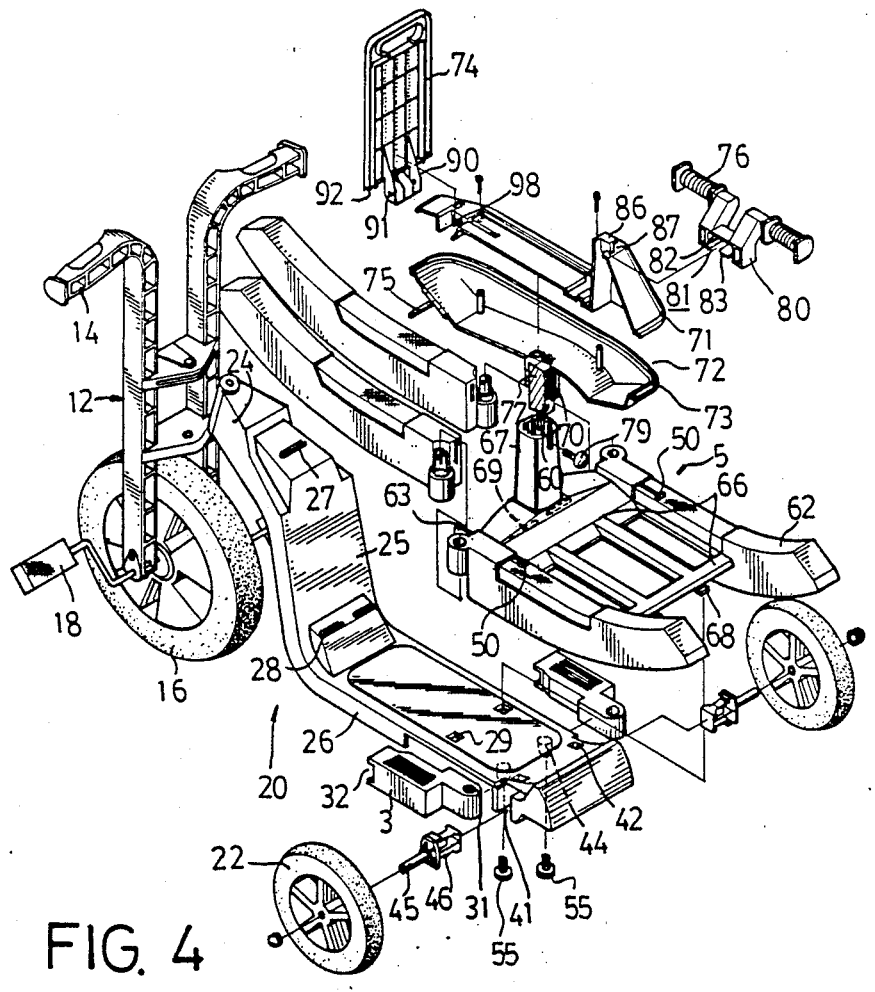
FIG. 4 is an exploded perspective view of the tricycle of FIG. 3.

Referring to the drawings, and more particularly to FIGS. 1 and 4, the present invention comprises a scooter 1 and a rocking horse 5. The scooter 1 includes a front portion 12 which is generally a frame with a handle 14 fixed on the upper end and a front wheel 16 with a driving pedal 18 rotatably disposed on the lower end thereof, and a rear portion 20 which is substantially a Z-shaped foot plate, including a front plate 24, a central plate 25 and a rear plate 26. A free end of the front plate 24 is pivoted on the front portion 12 and the rear end of the rear plate 26 has two rear wheels 22 attached thereto. A first female retainer 27 is disposed on the front plate 24, and two second female retainers 28 are disposed at the abutment of the central plate 25 and the rear plate 26. Two mortises 29 are formed on the rear part of the rear plate 26. Two extending stubs 3 are pivoted on both lower sides of the rear end of the rear plate 26, the extending stubs 3, as shown in FIG. 1, are in rest position which is beneath the rear plate 26, and as shown in FIG. 3, are in working position in which the stubs 3 rotate 90 degrees from the rest position.

Figure 2:
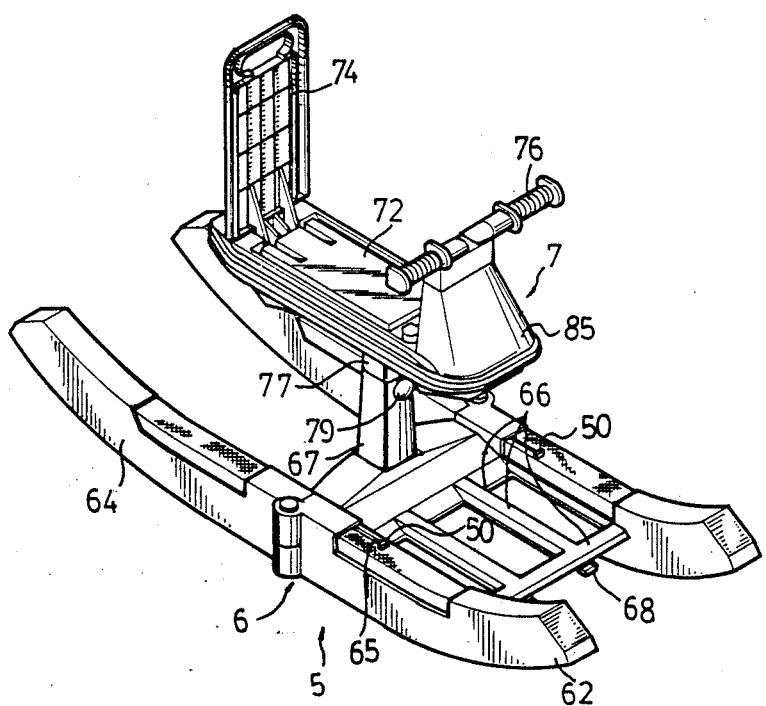
FIG. 2 is a perspective view of a rocking horse in accordance with the present invention.

Referring now to FIG. 2, the rocking horse 5 includes a base portion 6 and a seat portion 7. The base portion 6 has two parallel foldable bars, each including a front parts 62 and a rear part 64. The two front parts 62 are connected together by several bars 66. Each of the rear parts 64 is pivotably connected to a respective front part 62. As shown in FIG. 2, a retaining hole 65 is formed and aligned in the abutting end of each of the parallel bars 62, 64 so that the parallel bars 62, 64 are fixed at a working position by a retaining shaft 63 which is retained in the retaining holes 65 of both bars 62, 64. A grip 50 is connected to the retaining shaft 63 and protruded from the bars 62 for pushing the retaining shaft 63. As shown in FIG. 3, in rest position the parallel bars 62, 64 are folded by pushing the retaining shaft 63 into the retaining holes 65 of the front part 62. Two tenons 68 are formed on the front edge of the bars 66. A first support post 67 is provided at the central position of the base portion 6 and fixed on the bar 66. The seat portion 7 includes a seat cushion 72, a folding seat back 74, a handle 76 and a second support post 77. The second support post 77 is supported on the first support post 67 by such as a spigot joint and further fixed thereon by such as a screw 79 (as shown in FIG. 4). Several reinforced ribs 70 are formed on the peripheral surface of the second support post 77, and several grooves 60 relative to the reinforced ribs 70 are formed on the upper inner surface of the first support post 67 so as to improve the spigot joint therebetween.

Figure 5:
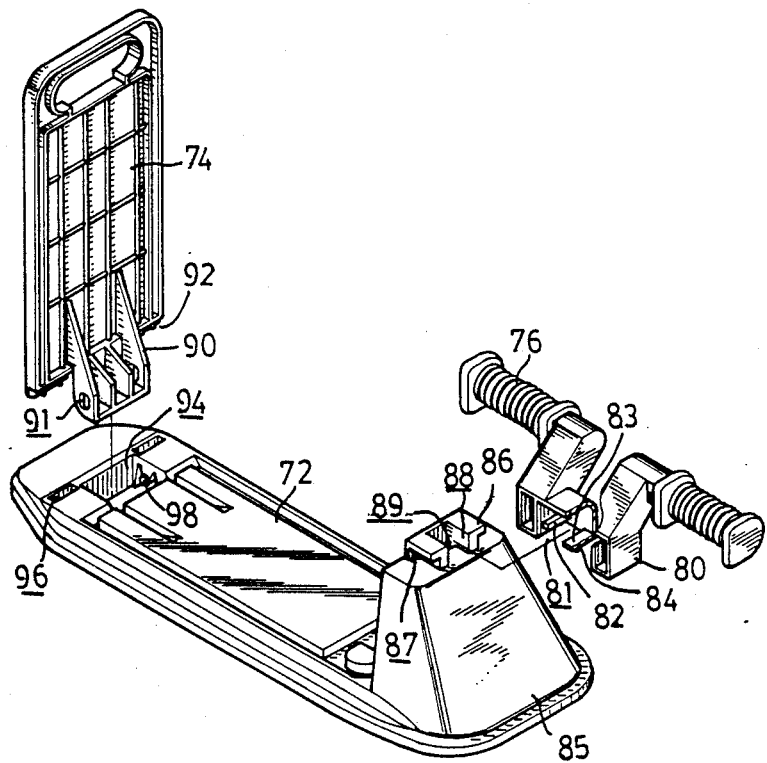
FIG. 5 is an exploded perspective view of the seat portion of the rocking horse of FIG. 2.

Referring to FIGS. 2 to 5, especially to FIG. 5, the handle 76 of the seat portion 7 has a central frame portion 80 with a compartment 81. Two symmetric extending rods 82 and one keep plate 83 are provided within the compartment 81 with a flange 84 formed on the lower surface of the keep plate 83. A platform 85 is provided on one end of the seat cushion 72, and a retainer frame 86 with two lateral recesses 87 and one central recess 88 is provided on top of the platform 85. A groove 89 is further formed in the central recess 88 for receiving the flange 84 of the keep plate 83. The handle 76 is clamped on the retainer frame 86 by the insertion of the extending rod 82 and the keep plate 83 into the respective lateral recesses 87 and the central recess 88 and by the fastening of the flange 84 of the keep plate 83 in the groove 89. A bracket 90 with two slender holes 91 is disposed on the lower surface of the seat back 74, and two holding flanges 92 are formed on one end face of the seat back 74. A cavity 94 and two holding recesses 96 are formed on the seat cushion 72 for receiving the respective bracket 90 and holding flanges 92. Two discs 98 are formed on both sides of the cavity 94 in order that the slender holes 91 receive the respective discs 98. The bracket 90 as well as the seat back 74 can move slightly with respect to the discs 98 due to the slender holes 91 so that the seat back 74 can move vertically upwards. In this way, the flanges 92 are insertable into the respective holding recesses 96, thereby erecting the seat back 74, and two holding flanges 92 are formed on one end face of the seat back 74. A cavity 94 and two holding recesses 96 are formed on the seat cushion 72 for receiving the respective bracket 90 and the holding flanges 92. Two discs 98 are formed on both sides of the cavity 94. The bracket 90 is force-fitted into the cavity 94 in order that the slender holes 91 receive the respective discs 98. The bracket 90 as well as the seat back 74 can move slightly with respect to the discs 98 due to the slender holes 91 so that the seat back 74 can move up vertically, therefore, the flanges 92 can be inserted into the respective holding recesses 96, thereby erecting the seat back 74.

Figure 6:
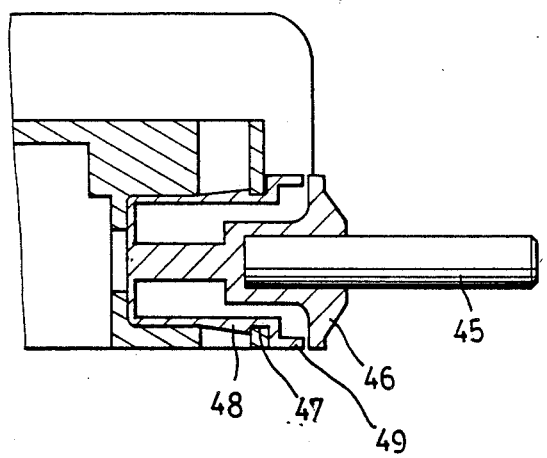
FIG. 6 is a partial cross-sectional view of the detachable wheel axle of the tricycle of FIG. 3.
Figure 7:
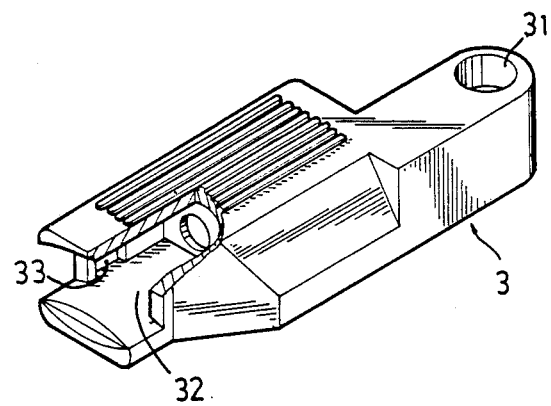
FIG. 7 is a perspective view of an extending stub in accordance with the present invention.

Referring to FIGS. 4, 6 and 7, two lateral holding cavities 41 each with a vertical intersecting rectangular through hole 42 are formed on a rear part of both sides of the rear plate 26 of the scooter 1. Two short cylinders 44 extend beneath the lower surface of the rear plate 26. Two wheel axles 45 are each clamped on a respective supporter 46, which has two resilient sheets 47 each with a wedge 48 and an outwardly stepped edge 49. The supporters 46 are force-fitted in the respective holding cavities 41 via the wedges 48 of the resilient sheets 47 (as shown in FIG. 6). The extending stub 3 has a vertical cylindrical hole 31 formed on one end for receiving the short cylinder 44, the other end of which has a retaining cavity 32 similar to the holding cavity 41 of rear plate 26. Two retaining slots 33 are formed on each side of the retaining cavity 32. The extending stub 3 is rotatable about the short cylinder 44. A screw 55 (FIG. 4) is provided to rotatably retain the extending stub 3 at position. Therefore, by pressing the stepped edge 49, the supporter 46 is detachable from the holding cavity 41, and the supporter 46 can subsequently be force-fitted into the retaining cavity 32 in order to extend the rear wheel axle.

Referring to FIG. 4, the seat cushion 72 comprises an upper seat 71 and a lower seat 73 clamped together by a force-fitted joint, tenon jointing and/or screw joint, etc. A first male retainer 75 is fixed beneath the lower seat 73 corresponding to the first female retainer 27. Two second male retainers 69 are fixed beneath the bars 66 corresponding to the second female retainers 28. To form the tricycle of FIG. 3 from the scooter 1 parts (FIG. 1) and the rocking horse 5 parts (FIG. 2), first, the supporters 46 are detached, the extending stubs 3 are rotated in parallel with the rear wheel axle, and the supporters 46 are inserted into the respective retaining cavities 32 of the extending stubs 3 so as to extend the rear wheel axle of the scooter 1. Second, the retaining shaft 63 is moved either forward or backward into one of the bars 62, 64, folding the rear part 64 forward and bearing against the front part 62. Third, the tenons 68 are inserted into the respective mortises 29, the rocking horse 5 is pushed downward so that the first and second male retainers 75 and 69 are force-fitted into the respective first and second female retainers 27 and 28 in order to form a tricycle as shown in FIG. 3.

Generally speaking, most of the parts of the toy kit are made of plastic materials in order to provide resilient characteristics. For example, the force-fitted joint between the male and female retainers 75, 69 and 27, 28 between the upper seat 71 and lower seat 73 of the seat portion 7, or the connection of the handle 76 to the platform 85, etc., are all preferably made of some type of resilient plastic material.

Although this invention has been described with a certain degree of particularity, it is understood that the present disclosure has been made by way of examples only and that numerous changes in the detail of construction and the combination and arrangements of parts may be resorted to without departing from the spirit and scope of the invention as hereinafter claimed.

I claim:

1. A convertible toy kit comprising:
 a scooter including a front portion having a pair of handles on an upper end thereof and a front wheel on a lower end thereof; a pair of driving pedals pivoted on an axle of said front wheel; a front plate having a front end thereof vertically and pivotally connected to a center portion of said front portion so that said front portion is rotatable relative to said foot plate about a vertical axis; a pair of wheel assemblies provided on a rear end of said foot plate; and at least one set of female retainers provided on said foot plate; and
 a rocking horse including a base portion and a seat portion; said base portion having a pair of parallel and foldable bars, each of said parallel bars including two halves pivotally connected together, one half of each of said parallel bars being fixed together by several lateral bars and an other half thereof being foldable to abut said one half, one set of male retainers being provided on said lateral bars; said seat portion being fixed on said base portion; said rocking horse being fixable on said scooter via said female retainers and said male retainers.

2. A convertible toy kit according to claim 1, wherein two first lateral cavities are formed in both sides of said rear end of said foot plate, each said wheel assembly including two sets of supporters, one end of each said supporter being force fitted into a respective first lateral cavity; an axle fixed on an other end of each said supporter; a pair of rear wheels disposed on said axles; and two extending stubs, one end of each said extending stub being pivoted on one side of a lower surface of said rear end of said foot plate close to one of said respective first lateral cavities, each said extending stub having a pivot axis substantially vertical to said foot plate so that said extending stubs are foldable to a position parallel to said foot plate and are located beneath said foot plate, and said extending stubs are rotatable to a position vertically extending outward from said foot plate, each said extending stub having a free end with a second lateral cavity formed therein, said supporters being readily detachable from said foot plate and insertable into said second lateral cavities of said extending stubs so that said rear wheels are extendable.

3. A convertible toy kit according to claim 1, wherein each set of said female retainers includes at least one female retainer and at least one mortise.

4. A convertible toy kit according to claim 1, wherein each set of said male retainers includes at least one male retainer and at least one tenon.

5. A convertible toy kit according to claim 1, wherein a pair of male and female retainers are further provided, on said respective, foot plate of said scooter and said seat portion of said rocking horse for improving a connection therebetween.

6. A convertible toy kit according to claim 1, wherein a retaining hole is formed at an abutting end of each of said front and rear portions of the parallel bars of said rocking horse and a retaining shaft is slidably disposed within said retaining hole, said rear portion being foldable when said retaining shaft is pushed into said retaining hole of said front portion, said retaining shaft being pushed and retained within said retaining holes of both said front and rear portions so as to maintain the parallel bars in working position when said front and rear portions are aligned.

7. A convertible toy kit according to claim 6, wherein a grip is connected to each of said retaining shafts and protruded from said retaining hole of said front portion.

8. A convertible toy kit according to claim 1, wherein a first support post is vertically provided on a center portion of an upper surface of said base portion, a second support post is vertically provided on a center portion of a lower surface of said seat portion, an upper end of said first support post and a lower end of said second support post are coupled together by a spigot joint, a plurality of reinforced ribs and grooves being formed respectively on said first and said second support posts of said rocking horse for improving said spigot joint therebetween.

* * * * *